(12) United States Patent
Okamoto et al.

(10) Patent No.: US 12,496,814 B2
(45) Date of Patent: Dec. 16, 2025

(54) LAMINATE, BLISTER CONTAINER, AND PUSH-THROUGH PACKAGE

(71) Applicant: ZACROS Corporation, Tokyo (JP)

(72) Inventors: Hajime Okamoto, Tokyo (JP); Kousuke Kashima, Tokyo (JP); Toyoaki Suzuki, Tokyo (JP)

(73) Assignee: ZACROS CORPORATION, Tokyo (JP)

( * ) Notice: Subject to any disclaimer, the term of this patent is extended or adjusted under 35 U.S.C. 154(b) by 164 days.

(21) Appl. No.: 16/493,758

(22) PCT Filed: Mar. 12, 2018

(86) PCT No.: PCT/IB2018/000234
§ 371 (c)(1),
(2) Date: Sep. 13, 2019

(87) PCT Pub. No.: WO2018/167558
PCT Pub. Date: Sep. 20, 2018

(65) Prior Publication Data
US 2020/0031104 A1    Jan. 30, 2020

(30) Foreign Application Priority Data
Mar. 17, 2017    (JP) .................. 2017-053664

(51) Int. Cl.
*B32B 27/30* (2006.01)
*B32B 7/12* (2006.01)
(Continued)

(52) U.S. Cl.
CPC .............. *B32B 27/30* (2013.01); *B32B 27/32* (2013.01); *A61J 1/035* (2013.01);
(Continued)

(58) Field of Classification Search
None
See application file for complete search history.

(56) References Cited

U.S. PATENT DOCUMENTS 3,169,936 A * 2/1965 Armour .................. C09J 123/28
523/437
4,751,270 A * 6/1988 Urawa .................. C08F 255/02
525/244
(Continued)

FOREIGN PATENT DOCUMENTS

CN    1285785 A    2/2001
CN    1222408 C    10/2005
(Continued)

OTHER PUBLICATIONS

Polymer Properties Database, Polyethylene Naphthalate (PEN), https://polymerdatabase.com/Polymer%20Brands/PEN.html (Year: 2015).*

(Continued)

*Primary Examiner* — Frank J Vineis
*Assistant Examiner* — Nicole T Gugliotta
(74) *Attorney, Agent, or Firm* — XSENSUS LLP

(57) ABSTRACT

A laminate has a substrate layer, an intermediate layer, and a fluorine-based resin layer in this order, in which a total light transmittance of the laminate is 85% or more and a haze value of the laminate is 35% or less.

4 Claims, 1 Drawing Sheet

(51) Int. Cl.
  B32B 27/08 (2006.01)
  B32B 27/32 (2006.01)
  B32B 27/36 (2006.01)
  B65D 65/40 (2006.01)
  B65D 75/32 (2006.01)
  A61J 1/03 (2023.01)

(52) U.S. Cl.
  CPC ...... *B32B 2307/7246* (2013.01); *B65D 65/40* (2013.01); *B65D 75/32* (2013.01)

(56) References Cited

U.S. PATENT DOCUMENTS

| | | | |
|---|---|---|---|
| 5,139,878 A * | 8/1992 | Kim | B32B 27/08 428/421 |
| 5,783,273 A | 7/1998 | Yamamoto et al. | |
| 5,911,325 A * | 6/1999 | Breitler | B65D 75/323 206/539 |
| 6,555,190 B1 | 4/2003 | Tsai | |
| 2003/0008152 A1 | 1/2003 | Tsai et al. | |
| 2003/0203141 A1* | 10/2003 | Blum | B65D 75/36 428/35.7 |
| 2004/0197567 A1 | 10/2004 | Tsai et al. | |
| 2005/0252818 A1* | 11/2005 | Altman | B32B 27/32 206/528 |
| 2006/0014022 A1 | 1/2006 | Kendig et al. | |
| 2015/0125676 A1 | 5/2015 | Mizutani | |
| 2019/0367245 A1 | 12/2019 | Okamoto et al. | |

FOREIGN PATENT DOCUMENTS

| | | |
|---|---|---|
| CN | 101052676 A | 10/2007 |
| CN | 110121419 A | 8/2019 |
| JP | 2001-522741 A | 11/2001 |
| JP | 2003-064226 A * | 3/2003 .............. C08L 23/04 |
| JP | 2004-501799 A | 1/2004 |
| JP | 2008-507597 A | 3/2008 |
| JP | 2012-135980 A | 7/2012 |
| JP | 2014-028508 A | 2/2014 |
| WO | 2006019922 A1 | 2/2006 |

OTHER PUBLICATIONS

"Deep-draw." Merriam-Webster.com Dictionary, Merriam-Webster, https://www.merriam-webster.com/dictionary/deep-draw. (Year: 2023).*
International Search Report dated Jun. 12, 2018 for PCT/IB2018/000234 and English translation; 5 pgs.
International Preliminary Report on Patentability dated Sep. 17, 2019 for PCT/IB2018/000234 and English translation thereof; 12 pgs.
Office Action in corresponding Chinese Patent Application No. 201880018629.5 dated Dec. 9, 2020 with English summary, 5 pgs.
Extended European Search Report in corresponding European Patent Application No. 18768450.1 dated Nov. 4, 2020, 8 pgs.
Office Action in corresponding Japanese Patent Application No. 2017-053664 dated Feb. 24, 2021 with English Summary, 8 pgs.
Office Action in corresponding Indonesian Patent Application No. P00201909082 dated Jun. 21, 2021, 10 pgs.
Office Action in corresponding Chinese Patent Application No. 201880018629.5 dated Jul. 2, 2021, 16 pgs.
Notice of Allowance in corresponding Japanese Patent Application No. 2017-053664 dated Oct. 5, 2021; 5 pgs.
Office Action in corresponding Chinese Patent Application No. 201880018629.5 dated Dec. 9, 2021; 7 pgs.
Notice of Allowance in corresponding Chinese Patent Application No. 201880018629.5 dated Apr. 2, 2022; 3 pgs.
Notice of Allowance in Corresponding European Patent Application No. 18768450.1, dated Sep. 6, 2022; 33 pgs.

* cited by examiner

LAMINATE, BLISTER CONTAINER, AND PUSH-THROUGH PACKAGE

CROSS REFERENCE TO RELATED APPLICATION

This application is a National Phase of PCT/IB2018/000234 filed on Mar. 12, 2018, which, in turn, claimed the priority of Japanese Patent Application No. 2017-053664 which was filed on Mar. 17, 2017.

TECHNICAL FIELD

The present invention relates to a laminate, a blister container, and a press-through package.

BACKGROUND TECHNOLOGY

A film laminate having high barrier properties is used in packaging materials for foods, medicines, and the like. In the pharmaceutical field, for individual packaging of tablets and capsules, a press-through package (hereinafter, may be referred to as "PTP") is used.

For suppressing deterioration of the content, a resin film that is a PTP forming material is required to have barrier properties to water vapor. For example, Patent Documents 1 and 2 describe a laminate in which a fluorine-based resin film is laminated in order to improve barrier properties to water vapor.

DOCUMENTS OF RELATED ART

Patent Documents

Patent Document 1: Japanese Unexamined Patent Application, First Publication No. 2014-028508
Patent Document 2: Japanese Unexamined Patent Application, First Publication No. 2012-135980

SUMMARY OF THE INVENTION

Problem to be Solved by the Invention

The present inventors have made a study in order to manufacture a laminate having high barrier properties to water vapor, using a fluorine-based resin having high barrier properties. As a result, it has been found that a laminate including a fluorine-based resin film has high barrier properties to water vapor, but the visibility may be easily deteriorated when the film is made into a laminate. Generally, a resin film that is a PTP forming material is required to have good visibility.

In addition, in the present specification, the visibility is defined by a total light transmittance (light transmittance) or a haze value. In this definition, "the visibility is deteriorated" means that "a total light transmittance is reduced" or "a haze value is increased".

Then, the inventors have further made a study intensively, resulting in the invention of a laminate having a low water vapor permeability and good visibility. Furthermore, the present invention provides a blister container and a press-through package each including the laminate.

Means for Solving the Problem

In order to solve the above-mentioned problem, one aspect of the present invention provides a laminate comprising a substrate layer, an intermediate layer, and a fluorine-based resin layer in this order, wherein a total light transmittance of the laminate is 85% or more and a haze vale of the laminate is 35% or less.

In one aspect of the present invention, the laminate may have a configuration that the laminate further comprises a second intermediate layer and a second substrate layer in this order on a surface of the fluorine-based resin layer, the surface being opposite to a surface on which the intermediate layer is formed.

In one aspect of the present invention, the laminate may have a configuration that the fluorine-based resin layer contains polychlorotrifluoroethylene.

In one aspect of the present invention, the laminate may have a configuration that the intermediate layer contains a polyethylene-based resin and a modified polyethylene-based resin.

In one aspect of the present invention, the laminate may have a configuration that the intermediate layer contains a polyethylene-based resin, an elastomer component, and a component having an epoxy group.

In one aspect of the present invention, the laminate may have a configuration that a water vapor permeability of the laminate is 0.5 $g/m^2/24$ hours or less.

One aspect of the present invention provides a blister container comprising the laminate.

One aspect of the present invention provides a press-through package comprising the laminate.

Effects of Invention

According to the present invention, there are provided a laminate having low water vapor permeability and good visibility, as well as a blister container and a press-through package each including the laminate.

BEST MODE FOR CARRYING OUT THE INVENTION

The laminate according to embodiments of the present invention, as well as a blister container and a press-through package each including the laminate will be described below with reference to FIG. 1 and FIG. 2. In addition, in these figures, a dimension, ratio, and the like of each element are appropriately made to be different from actual ones, so as to make each element have a size to such a degree that it can be recognized on the figures.

Laminate

First Embodiment

A laminate according to a first embodiment of the present invention will be described with reference to FIG. 1. FIG. 1 is a schematic cross-sectional view of the laminate according to the first embodiment.

Figure 1:
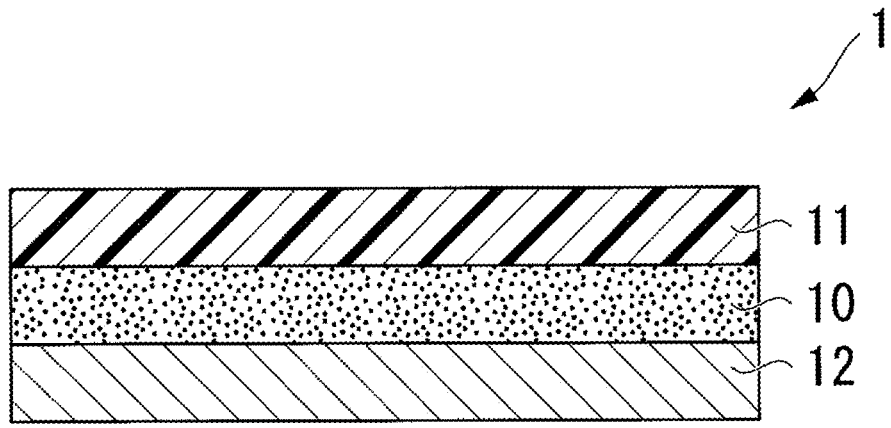
FIG. 1 is a schematic cross-sectional view of a laminate according to a first embodiment of the present invention.

As shown in FIG. 1, in a laminate 1 according to the first embodiment, a substrate layer 12, an intermediate layer 10, and a fluorine-based resin layer 11 are laminated in this order. The intermediate layer 10 functions as an adhesive agent layer, and the substrate layer 12 and the fluorine-based resin layer 11 are laminated with the intermediate layer 10 interposed therebetween.

The laminate 1 according to the first embodiment has a three-layer structure of the substrate layer 12, the intermediate layer 10, and the fluorine-based resin layer 11. Since the laminate of a three-layer structure can be manufactured not through complicated steps, and the uniformity in each layer of the laminate is more improved, the laminate of a three-layer structure is preferable.

Respective layers constituting the laminate of the present invention will be described below.

(Substrate Layer)

In the first embodiment, a material forming the substrate layer 12 is any one or more kinds of a polyolefin-based resin, a polyester-based resin, or a vinyl-based resin.

Examples of the polyolefin-based resin include a polyethylene resin, a polypropylene resin, a polymethylpentene resin, and the like.

Examples of the polyester-based resin include polyethylene terephthalate, polyethylene naphthalate, polyethylene isophthalate, polybutylene terephthalate, and the like.

Examples of the vinyl-based resin include a polyvinyl acetate-based resin, a polyvinyl chloride-based resin, and the like.

In the present embodiment, the polyester-based resin is preferable, and polyethylene terephthalate is more preferable.

In the present embodiment, by using any one or more kinds of the above-mentioned resins for forming the substrate layer 12, the moldability upon molding in drawing becomes good, for example.

In the first embodiment, a thickness of the substrate layer 12 is not particularly limited, and examples of a lower limit value include 50 μm or more, 80 μm or more, and 100 μm or more. Furthermore, examples of an upper limit value include 250 μm or less, 220 μm or less, and 200 μm or less.

The above-mentioned upper limit values and lower limit values can be arbitrarily combined.

In the first embodiment, by adjusting the thickness of the substrate layer 12 to the above-mentioned lower limit value or more, the water vapor permeability of the laminate 1 can be reduced, and for example, when the laminate 1 is used in a press-through package for medicines, high dampproofness can be exerted, and deterioration of the content due to water vapor can be prevented.

Furthermore, in the first embodiment, by adjusting the thickness of the substrate layer 12 to the above-mentioned upper limit value or less, the visibility of the laminate 1 becomes good, and manufacturing cost can be reduced.

In the first embodiment, by selecting the substrate layer 12 having a thickness of the above-mentioned upper limit value or less, a total light transmittance of the laminate 1 can be controlled to a desired value. Furthermore, by selecting the substrate layer 12 having a thickness of the above-mentioned upper limit value or less, a haze value of the laminate 1 can be controlled to a desired value.

(Intermediate Layer)

In the present embodiment, it is preferable that the intermediate layer either contains a polyethylene-based resin and a modified polyethylene-based resin or contains a polyethylene-based resin, an elastomer component, and a resin composition containing an epoxy group.

In the present specification, the intermediate layer containing a polyethylene-based resin and a modified polyethylene-based resin may be referred to as "intermediate layer (1)". Furthermore, the intermediate layer containing a polyethylene-based resin, an elastomer component, and a resin composition containing an epoxy group may be referred to as "intermediate layer (2)".

Intermediate Layer (1)

Examples of the polyethylene-based resin contained in the intermediate layer (1) include linear low-density polyethylene (LLDPE), low-density polyethylene (LDPE), medium-density polyethylene (MDPE), and high-density polyethylene (HDPE), and it is preferable that the polyethylene-based resin is linear low-density polyethylene.

The modified polyethylene-based resin contained in the intermediate layer (1) is a polyethylene-based resin modified with unsaturated carboxylic acid or a derivative of the unsaturated carboxylic acid, and has an acid functional group such as a carboxy group and a carboxylic anhydride group in the polyethylene-based resin. In the present embodiment, one obtained by acid-modifying the polyethylene-based resin is preferable.

Examples of the acid-modifying method include graft modification in which a polyethylene-based resin and an acid functional group-containing monomer are melted and kneaded in the presence of a radical polymerization initiator such as an organic peroxide or an aliphatic azo compound.

A polyethylene-based resin material before modification is not limited as long as it contains ethylene as a raw material monomer, and a known polyethylene-based resin is appropriately used. Specifically, examples thereof include ethylene-α-olefin copolymers such as an ethylene-propylene copolymer, an ethylene-1-butene copolymer, an ethylene-4-methyl-1-pentene copolymer, an ethylene-1-hexene copolymer, and an ethylene-1-octene copolymer; ethylene-based copolymer resins such as an ethylene-vinyl acetate copolymer, an ethylene-(meth)acrylic acid copolymer, and an ethylene-(meth)acrylic acid ester copolymer; and the like, in addition to the examples that are mentioned above as the polyethylene-based resin.

The acid functional group-containing monomer is a compound having an ethylenic double bond and a carboxy group or a carboxylic anhydride group in the same molecule, and examples thereof include various unsaturated monocarboxylic acids and dicarboxylic acids or acid anhydrides of dicarboxylic acids.

Examples of the acid functional group-containing monomer having a carboxy group (carboxy group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

These acid functional group-containing monomers may be used alone, or two or more kinds thereof may be used jointly, in components constituting the intermediate layer.

Inter alia, as the acid functional group-containing monomer, an acid functional group-containing monomer having an acid anhydride group is preferable, a carboxylic anhydride group-containing monomer is more preferable, and maleic anhydride is particularly preferable.

When part of the acid functional group-containing monomer used for acid modification is unreacted, in order to prevent reduction in an adhesive force due to the unreacted acid functional group-containing monomer, it is preferable to use one from which the unreacted acid functional group-containing monomer has been removed in advance.

It is preferable that the modified polyethylene-based resin contained in the intermediate layer (1) is maleic anhydride-modified polyethylene.

In the intermediate layer (1), when the total mass of the polyethylene-based resin and the modified polyethylene-based resin is set to 100%, a lower limit value of a proportion of the polyethylene-based resin to the total mass of the polyethylene-based resin and the modified polyethylene-based resin is preferably 10% or more and further preferably 20% or more. Furthermore, an upper limit value of a proportion of the polyethylene-based resin to the total mass of the polyethylene-based resin and the modified polyethylene-based resin is preferably 70% or less and further preferably 60% or less. For example, a mixing ratio of the polyethylene-based resin and the modified polyethylene-based resin can take [polyethylene-based resin]:[modified polyethylene-based resin]=20:80 to 60:40.

In the present embodiment, by using a mixed material of the polyethylene-based resin and the modified polyethylene-based resin in the intermediate layer (1), the adhesion between the fluorine-based resin layer and the substrate layer can be improved. For this reason, a laminate that hardly causes interlayer peeling can be provided.

Intermediate Layer (2)

The intermediate layer (2) contains a resin composition containing a polyethylene-based resin, an elastomer component, and a component having an epoxy group.

The polyethylene-based resin contained in the intermediate layer (2) may be the same polyethylene-based resin as that contained in the above-mentioned intermediate layer (1), or may be a biomass-derived polyethylene-based resin, a petroleum-derived polyethylene-based resin or a mixture thereof.

As the polyethylene-based resin contained in the intermediate layer (2), a polyethylene-based resin polymerized with a metallocene-based catalyst is preferable. Inter alia, an ethylene-α olefin copolymer such as C4-LLDPE, C6-LLDPE, and C8-LLDPE polymerized with a metallocene-based catalyst, long chain branched polyethylene, and the like are preferable examples.

There is a tendency that the polyethylene-based resin polymerized with a metallocene-based catalyst has a narrow molecular weight distribution. For this reason, the content of a low molecular weight component that can be an adhesion inhibiting factor is low, and it is considered that high adhesiveness is obtained when such a polyethylene-based resin is used as an adhesive agent.

A density of the polyethylene-based resin in the above-mentioned resin composition is preferably 0.890 g/cm$^3$ or more and 0.940 g/cm$^3$ or less, and more preferably 0.910 g/cm$^3$ or more and 0.930 g/cm$^3$ or less.

A content of the polyethylene-based resin in the above-mentioned resin composition is 55 parts by mass or more and 90 parts by mass or less, and preferably 60 parts by mass or more and 80 parts by mass or less.

By adjusting the content of the polyethylene-based resin to the above-mentioned upper limit value or less, pressure-sensitive adhesiveness with an elastomer component described later is exerted, and the adhesiveness is increased.

Examples of the elastomer component contained in the intermediate layer (2) include a styrene-based elastomer, an acrylic-based elastomer, a urethane-based elastomer, an ester-based elastomer, and the like. However, as the elastomer component, a component having an epoxy group described later is excluded.

Inter alia, the styrene-based elastomer is preferable, and examples thereof include a block copolymer having a hard segment including polystyrene or the like and a soft segment including polyethylene, polybutadiene, polyisoprene, or the like. Examples of a styrene-based polymer usable for the styrene-based elastomer include aromatic olefin-aliphatic olefin copolymers such as a styrene-butadiene copolymer, a styrene-isoprene copolymer, and a styrene-ethylene copolymer.

It is preferable that the styrene-based elastomer is a styrene-ethylene-butylene-styrene copolymer (SEBS) in which unsaturated bonds in molecular chains of a styrene-butylene-styrene copolymer (SBS) have been completely hydrogenated.

Furthermore, a styrene content thereof is preferably 8% by mass or more and 24% by mass or less, and more preferably 10% by mass or more and 20% by mass or less.

By adjusting the styrene content to the above-mentioned upper limit value or less, curing of a resin is suppressed and reduction in adhesiveness can be suppressed.

Specific examples of the elastomer component contained in the intermediate layer (2) include DYNARON from JSR Corporation, TUFTEC H series from Asahi Kasei Chemicals Corporation, Kraton G polymer from Kraton Polymer Co., Ltd., and the like.

In the intermediate layer (2), a content of the elastomer component is 10 parts by mass or more and 45 parts by mass or less, and preferably 20 parts by mass or more and 40 parts by mass or less.

By adjusting the content of the elastomer component to the above-mentioned upper limit value or less, reduction in tensile strength when an adhesive agent layer is formed is suppressed, and reduction in adhesive strength can be prevented.

In addition, the total of the above-mentioned polyethylene-based resin and the above-mentioned elastomer component in the intermediate layer (2) is set to 100 parts by mass.

As the component having an epoxy group and contained in the intermediate layer (2), a component having an epoxy group and a vinyl group is preferable. As the component having an epoxy group and a vinyl group, a component having a 1,2-vinyl structure is preferable, and epoxidized polybutadiene in which butadiene has been partially epoxidized is preferable. One in which 1,2-polybutadiene has been partially epoxidized is particularly preferable.

Specific examples of the component having an epoxy group include liquid polybutadiene JP-100 and JP-200 from NIPPON SODA CO., LTD., Adekacizer BF-1000 from ADEKA CORPORATION, and the like.

It is preferable that a number average molecular weight of the component having an epoxy group is 500 or more and 4,000 or less.

By adjusting the number average molecular weight of the component having an epoxy group to the above-mentioned upper limit value or less, reduction in pressure-sensitive adhesiveness due to becoming the solid state at an ambient temperature is suppressed, and reduction in adhesiveness can be prevented.

A number average molecular weight in the present embodiment is a value in terms of polystyrene, which is measured by gel permeation chromatography (GPC).

In the intermediate layer (2), a content of the component having an epoxy group to the total amount of 100 parts by mass of the above-mentioned polyethylene-based resin and the above-mentioned elastomer component is 0.1 parts by mass or more and 1.5 parts by mass or less, and preferably 0.5 parts by mass or more and 1.0 part by mass or less.

By adjusting the content of the component having an epoxy group to the above-mentioned upper limit value or less, a low molecular weight component in the resin composition, which is an adhesion inhibiting factor, can be reduced.

In the intermediate layer (2), the above-mentioned elastomer component and the component having an epoxy group are mutually compatible due to having a common repetition unit. As the elastomer component and the component having an epoxy group, a combination of styrene-based elastomers, or a combination of acrylic-based elastomers is preferable.

The resin composition of the intermediate layer (2) is obtained by mixing the polyethylene-based resin, the elastomer component, and the component having an epoxy group at a specific blending ratio. In the resin composition of the first embodiment, the epoxy group in the component having an epoxy group is compatible with a fluorine component of the fluorine-based resin, and adhesiveness with the fluorine-based resin is excellent. When the resin composition of the present embodiment contains the component having an epoxy group, adhesion with a metal material also becomes possible.

In the intermediate layer (2), by mixing the polyethylene-based resin, the elastomer component, and the component having an epoxy group at a specific blending ratio, a so-called sea-island structure can be formed in which the polyethylene-based resin corresponds to the "sea" and the elastomer component corresponds to the "island". Furthermore, by compatibilizing the component having an epoxy group into the elastomer component, the component having an epoxy group can be uniformly dispersed in the resin composition. Thereby, the epoxy group is protected with the polyethylene-based resin and the elastomer component, and ring-opening of the epoxy group due to moisture is suppressed.

In the first embodiment, a thickness of the intermediate layer 10 is 5 µm or more and 50 µm or less, and preferably 10 µm or more and 30 µm or less.

By adjusting the thickness of the intermediate layer 10 to the above-mentioned lower limit value or more, the adhesion can be improved, and interlayer peeling can be prevented. Furthermore, by adjusting the thickness of the intermediate layer 10 to the above-mentioned upper limit value or less, reduction in visibility due to an increase in film thickness can be prevented.

By selecting the intermediate layer 10 having a thickness of the above-mentioned upper limit value or less, a total light transmittance of the laminate 1 can be controlled to a desired value. Furthermore, by selecting the intermediate layer 10 having a thickness of the above-mentioned upper limit value or less, a haze value of the laminate 1 can be controlled to a desired value.

Usually, when a poor adhesion part is present between the substrate layer 12 and the intermediate layer 10, or between the intermediate layer 10 and the fluorine-based resin layer 11, the part serves as a source of light scattering, and the light passing through the laminate 1 is scattered. It is considered that, by scattering the transmitted light, a haze value of the laminate 1 is increased. That is, it is considered that the visibility of the laminate 1 is reduced.

By using the intermediate layer 10 having the above-mentioned configuration, the poor adhesion between the intermediate layer 10 and the substrate layer 12 or the fluorine-based resin layer 11 can be suppressed. Accordingly, in the present embodiment, reduction in visibility due to this poor adhesion of the intermediate layer 10 can be suppressed.

By forming the intermediate layer 10 using the above-mentioned materials, a laminate can be provided in which interlayer peeling is hardly caused at the interface between the substrate layer 12 and the intermediate layer 10, or the interface between the intermediate layer 10 and the fluorine-based resin layer 11. Furthermore, by suppressing the poor adhesion of the intermediate layer 10, reduction in visibility due to the poor adhesion can be suppressed.

(Fluorine-Based Resin Layer)

As the fluorine-based resin material used for the fluorine-based resin layer 11, polytetrafluoroethylene (PTFE), a tetrafluoroethylene-perfluoroalkyl vinyl ether copolymer (PFA), a tetrafluoroethylene-hexafluoropropylene copolymer (FEP), tetrafluoroethylene-hexafluoropropylene-perfluoroalkyl vinyl ether (EPA), a tetrafluoroethylene-ethylene copolymer (ETFE), polyvinylidene fluoride (PVDF), polychlorotrifluoroethylene (PCTFE), a chlorotrifluoroethylene-ethylene copolymer (ECTFE), a mixture of one or two or more kinds thereof, and the like can be used, and polychlorotrifluoroethylene (PCTFE) is preferable.

As a thickness of the fluorine-based resin layer 11, in any of the first embodiment and a second embodiment described later, a lower limit value is preferably 5 µm or more, and more preferably 10 µm or more. Furthermore, an upper limit value is preferably 300 µm or less, more preferably 200 µm or less, further preferably 50 µm or less, and particularly preferably 45 µm or less.

The above-mentioned upper limit values and lower limit values can be arbitrarily combined.

By adjusting the thickness of the fluorine-based resin layer 11 to the above-mentioned lower limit value or more, the water vapor permeability of the laminate 1 can be reduced, and for example, when the laminate 1 used in a press-through package for medicines, high dampproofness can be exerted, and deterioration of the content due to water vapor can be prevented.

By adjusting the thickness of the fluorine-based resin layer 11 to the above-mentioned upper limit value or less, the visibility of the laminate 1 becomes good, and manufacturing cost can also be reduced.

By selecting the fluorine-based resin layer 11 having a thickness of the above-mentioned upper limit value or less, a total light transmittance of the laminate 1 can be controlled to a desired value. Furthermore, by selecting the fluorine-based resin layer 11 having a thickness of the above-mentioned upper limit value or less, a haze value of the laminate 1 can be controlled to a desired value.

The laminate 1 including a three-layer structure of the substrate layer 12, the intermediate layer 10, and the fluorine-based resin layer 11 as described above has good visibility. In the laminate 1 of the first embodiment, the total light transmittance is 85% or more, and the haze value is 35% or less. When the total light transmittance and haze value of the laminate 1 are the above-mentioned values, for example, the visibility of a molded article manufactured by drawing easily becomes good.

In any of the first embodiment and a second embodiment described later, the total light transmittance of the laminate 1 is preferably 88% or more, and more preferably 90% or more. Furthermore, in the laminate 1 of the present embodiment, the haze value is preferably 25% or less, and more preferably 15% or less.

In the present embodiment, preferable ranges of the total light transmittance and haze value can be arbitrary combined.

In the present specification, the total light transmittance of the laminate 1 is a value measured based on JIS K7105, "Testing methods for optical properties of plastics".

In the present specification, the haze value of the laminate 1 is a value measured based on JIS K7136, "Plastics-determination of haze for transparent materials".

Usually, as a difference in refractive indices of adjacent two layers with the interface interposed between the adjacent two layers is smaller, reflection or scattering at the interface is less likely to be caused, and a total light transmittance easily becomes higher. In the present embodiment, it is configured that a difference in refractive indices between the substrate layer 12 and the intermediate layer 10, or between the intermediate layer 10 and the fluorine-based resin layer 11 is as small as around 0.1. By selecting the intermediate layer 10 having such a configuration, good visibility can be achieved. That is, by selecting the intermediate layer 10 having such a configuration, the total light transmittance of the laminate 1 can be 85% or more. Furthermore, the haze value of the laminate 1 can be 35% or less.

Furthermore, in the laminate 1 of the present embodiment, a yellowness index (YI) is preferably 20 or less, more preferably 15 or less, and further preferably 10 or less. As the yellowness index (YI) is lower, it is more preferable.

In the present specification, the yellowness index (YI) of the laminate 1 is a value measured based on JIS K 7105: 1981, "Determination by 'measuring method B of total luminous transmittance and reflectance'".

It is preferable that the laminate of the first embodiment is manufactured by simultaneously melting and extrusion-molding a resin that is to be a raw material for the above-mentioned substrate layer, a resin that is to be a raw material for the above-mentioned intermediate layer, and a resin that is to be a raw material for the above-mentioned fluorine-based resin layer.

The above-mentioned configuration can provide a laminate having low water vapor permeability and good visibility.

Second Embodiment

A laminate according to a second embodiment of the present invention will be described with reference to FIG. 2. FIG. 2 is a schematic cross-sectional view of the laminate according to the second embodiment.

Figure 2:
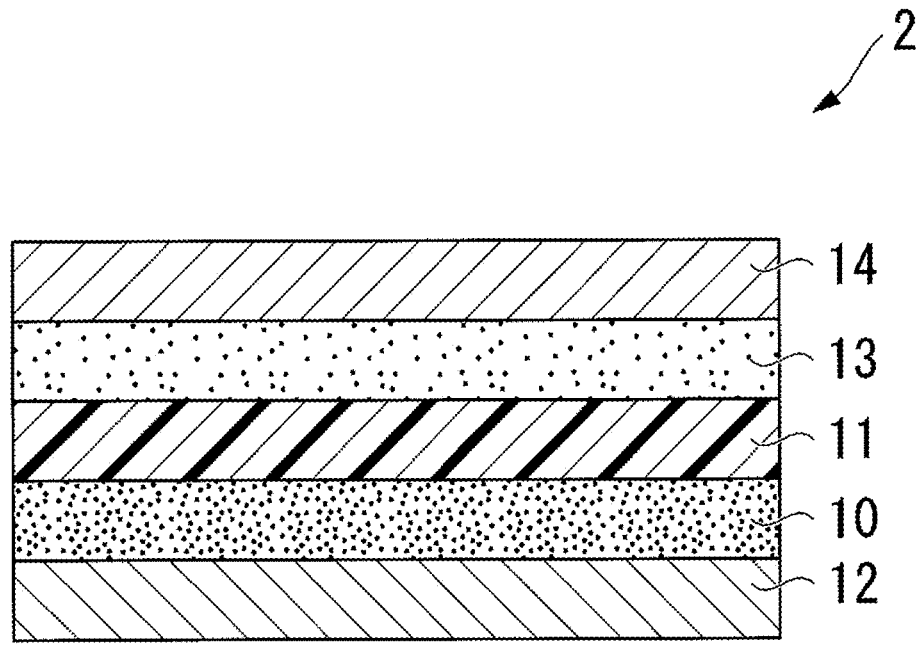
FIG. 2 is a schematic cross-sectional view of a laminate according to a second embodiment of the present invention.

In a laminate 2 according to the second embodiment shown in FIG. 2, a substrate layer 12, an intermediate layer 10, a fluorine-based resin layer 11, a second intermediate layer 13, and a second substrate layer 14 are laminated in this order.

Since the strength of a laminate of a five-layer configuration is increased, the laminate is preferable. Furthermore, since curling is hardly generated due to symmetry on both sides of the lamination configuration, the laminate of a five-layer configuration is preferable.

Respective materials constituting the substrate layer, the intermediate layer, and the fluorine-based resin layer in the second embodiment are the same as the respective materials described in the above-mentioned first embodiment.

In the second embodiment, a material constituting the substrate layer 12 and a material constituting the second substrate layer 14 may be the same or different, and preferably include the same resin material.

A thickness of the second substrate layer 14 to that of the substrate layer 12 is preferably 0.5 times to 1.1 times, more preferably 0.9 times to 1.1 times, and particularly preferably 0.95 times to 1.05 times.

In the second embodiment, a material constituting the intermediate layer 10 and a material constituting the second intermediate layer 13 may be the same or different, and preferably include the same resin material.

A thickness of the second intermediate layer 13 to that of the intermediate layer 10 is preferably 0.9 time to 1.1 times, and more preferably 0.95 time to 1.05 times.

In the second embodiment, the thickness of the substrate layer 12 is not particularly limited. As an example, a lower limit value of the thickness of the substrate layer 12 may be 20 μm or more, may be 30 μm or more, or may be 40 μm or more. Furthermore, an upper limit value of the thickness of the substrate layer 12 may be 120 μm or less, may be 110 μm or less, or may be 100 μm or less.

The above-mentioned upper limit values and lower limit values can be arbitrarily combined.

In the second embodiment, a lower limit value of the thickness of the intermediate layer 10 is 5 μm or more, and preferably 10 μm or more. Furthermore, an upper limit value of the thickness of the intermediate layer 10 is 50 μm or less, and preferably 30 μm or less.

The above-mentioned upper limit values and lower limit values can be arbitrarily combined.

Furthermore, it is preferable that the laminate according to the second embodiment is manufactured by simultaneously melting and extrusion-molding a resin that is to be a raw material for the above-mentioned substrate layer, a resin that is to be a raw material for the above-mentioned intermediate layer, a resin that is to be a raw material for the above-mentioned fluorine-based resin layer, a resin that is to be a raw material for the above-mentioned second intermediate layer, and a resin that is to be a raw material for the above-mentioned second substrate layer.

In the above-mentioned laminate, in any of the first embodiment and the second embodiment, a total film thickness is preferably 300 μm or less, and more preferably 290 μm or less.

Furthermore, in any of the first embodiment and the second embodiment, a water vapor permeability of the laminate is preferably 0.5 g/m$^2$/24 hours or less, more preferably 0.4 g/m$^2$/24 hours or less, and particularly preferably 0.3 g/m$^2$/24 hours or less.

In addition, the resin composition containing the polyethylene-based resin, the elastomer component, and the component having an epoxy group described in the first embodiment can be applied to any one or both of the intermediate layer 10 and the second intermediate layer 13 in the laminate according to the second embodiment. For example, the intermediate layer 10 may be formed of a composition of the polyethylene-based resin and the modified polyethylene-based resin, and the second intermediate layer 13 may be formed of the above-mentioned resin composition. Furthermore, the intermediate layer 10 may be formed of the above-mentioned resin composition, and the second intermediate layer 13 may be formed of a composition of the polyethylene-based resin and the modified polyethylene-based resin. It has been found out that in the laminate of a five-layer configuration, by symmetry on both sides of the lamination configuration, curling is hardly generated. For that reason, it is more preferable that the intermediate layer 10 and the second intermediate layer 13 contain the same constituent material.

According to the above-mentioned configuration, like the first embodiment, a laminate having low water vapor permeability and good visibility can be provided.

<Blister Container, Press-Through Package>

A blister container and press-through package according to embodiments of the present invention are manufactured by deep drawing the above-mentioned laminate of the first or second embodiment of the present invention.

When the above-mentioned laminate 1 according to the first embodiment of the present invention is used, the laminate 1 is deeply drawn so that the fluorine-based resin layer 11 faces an external side.

The press-through package according to embodiments of the present invention is used, for example, in individual packaging for tablets or capsules.

Since the above-mentioned laminate of the present invention has low water vapor permeability, deterioration of the content of tablets, capsules or the like can be prevented.

Examples of the preferable embodiments according to the present invention have been described above with reference to the attached drawings, and it goes without saying that the present invention is not limited to such examples. Various shapes, combinations, and the like of respective constituent members shown in the above-mentioned examples are one example, and can be variously changed based on design requirement and the like in a range not departing from the gist of the present invention.

EXAMPLES

The present invention will be described in further detail below by way of Examples, but the present invention is not limited by these Examples.

Laminate of Three-Layer Configuration

Examples 1 to 4, Comparative Example 1

Laminates of a three-layer configuration each having a substrate layer, an intermediate layer, and a fluorine-based resin layer in this order were manufactured. Resins that are to be raw materials for respective layers shown in Table 1, which had each been heated and melted separately, were subjected to multilayer film formation using an extruder that can perform co-extrusion multilayer molding, and laminates of a three-layer configuration having a substrate layer, an intermediate layer, and a fluorine-based resin layer in this order were obtained.

TABLE 1

| | Substrate layer | Intermediate layer | Fluorine-based resin layer | Total film thickness (μm) |
|---|---|---|---|---|
| Example 1 | PET [50 μm] | Intermediate layer 1 [20 μm] | PCTFE [25 μm] | 95 |
| Example 2 | PET [150 μm] | Intermediate layer 1 [20 μm] | PCTFE [25 μm] | 195 |
| Example 3 | PET [150 μm] | Intermediate layer 2 [20 μm] | PCTFE [25 μm] | 195 |
| Example 4 | PET [150 μm] | Intermediate layer 3 [20 μm] | PCTFE [25 μm] | 195 |
| Comparative Example 1 | PET [150 μm] | Intermediate layer 4 [20 μm] | PCTFE [25 μm] | 195 |

In Table 1, respective symbols mean the following materials. A numerical value in parenthesis is the thickness of each layer.

PET: Polyethylene terephthalate resin. NOVAPEX14 manufactured by Mitsubishi Chemical Corporation is used.

PCTFE: Polychlorotrifluoroethylene resin. DF0050-C1 manufactured by DAIKIN INDUSTRIES, LTD. is used.

Intermediate layers 1 to 4: Intermediate layers 1 to 4 shown in the following Table 2. A ratio of respective materials in Table 2 is a mass ratio (%).

TABLE 2

| | |
|---|---|
| Intermediate layer 1 | Linear low-density polyethylene (LLDPE)/maleic anhydride-modified polyethylene (ADMER) = 50/50 |
| Intermediate layer 2 | Polyethylene (PE)/elastomer/epoxidized polybutadiene = 70/30/1 |
| Intermediate layer 3 | Linear low-density polyethylene (LLDPE)/maleic anhydride-modified polyethylene (ADMER) = 90/10 |
| Intermediate layer 4 | Linear low-density polyethylene (LLDPE) |

As the materials of Table 2, the following commercial products were used.

Elastomer: Kraton G1657M (styrene content 13% by mass, $\rho=0.90$ g/cm$^3$, melt mass flow rate=22 g/10 min (230° C., 5 kgf), manufactured by KRATON CORPORATION)

Epoxidized polybutadiene: Epoxidized 1,2-polybutadiene, $\rho=0.99$ g/min, Mn=1,000, manufactured by ADEKA CORPORATION <Assessment 1>

Concerning respective laminates of Examples 1 to 4 and Comparative Example 1, the following respective tests were performed.

[Measurement of Water Vapor Permeability]

Concerning the laminates obtained according to the above-mentioned <Laminate of Three-Layer Configuration>, a water vapor permeability was measured under conditions of a cell temperature of 40° C. and a relative humidity of 90% RH using a water vapor permeability meter (manufactured by Systech Instruments, product name "L80-5000"), according to JIS K7129: 2008 (Method A). The water vapor permeability is expressed by the gram number of water vapor per area of 1 square meter, which permeated for 24 hours [g/m$^2$/24 h].

[Measurement of Total Light Transmittance]

Concerning the laminates obtained according to the above-mentioned <Laminate of Three-Layer Configuration>, a total light transmittance was measured under conditions of a temperature of 23° C. and a relative humidity of 50% using a haze meter (Haze Meter, NDH2000), according to JIS K7105 "Testing methods for optical properties of plastics".

[Measurement of Haze Value]

Concerning the laminates obtained according to the above-mentioned <Laminate of Three-Layer Configuration>, a haze value was measured under conditions of a temperature of 23° C. and a relative humidity of 50% using a haze meter (Haze Meter, NDH2000), according to JIS K7136 "Plastics-determination of haze for transparent materials".

[Visibility]

Based on the results of the above-mentioned [Measurement of Total Light Transmittance] and [Measurement of Haze Value], assessment was performed under the following criteria. In addition, in the present Example, ⊙, ○, and Δ were determined to be a good product, and x was determined to be a defective product.

⊙: The total light transmittance is 90% or more, and the haze value is less than 20%.
○: The total light transmittance is 85% or more, and the haze value is 35% or less.
Δ: The total light transmittance is less than 85%, or the haze value exceeds 35%.
x: The total light transmittance is less than 85%, and the haze value exceeds 35%.

TABLE 3

| | Water vapor permeability [g/m$^2$/24 h] | Total light transmittance | Haze value | Visibility |
|---|---|---|---|---|
| Example 1 | 0.28 | 89 | 20 | ○ |
| Example 2 | 0.25 | 88 | 25 | ○ |
| Example 3 | 0.25 | 87 | 33 | ○ |
| Example 4 | 0.25 | 85 | 35 | Δ |
| Comparative Example 1 | 0.25 | 45 | 60 | X |

As shown in the above-mentioned results, the laminates of Examples 1 to 4, to which the present invention had been applied, had low water vapor permeability and were also excellent in visibility. Concerning the laminate of Comparative Example 1, the water vapor permeability was equivalent to that of Examples, but the visibility was reduced due to deterioration of the adhesion between the substrate layer and the intermediate layer, or the adhesion between the intermediate layer and the fluorine-based resin layer.

Laminate of Five-Layer Configuration

Examples 5 to 8, Comparative Example 2

Laminates of a five-layer configuration each having a substrate layer, an intermediate layer, a fluorine-based resin layer, a second intermediate layer, and a second substrate layer in this order were manufactured. Resins that were to be raw materials for respective layers shown in Table 4, which had each been heated and melted separately, were subjected to multilayer film formation using an extruder that can perform co-extrusion multilayer molding, and laminates of a five-layer configuration having a substrate layer, an intermediate layer, a fluorine-based resin layer, a second intermediate layer, and a second substrate layer in this order were obtained.

TABLE 4

| | Substrate layer | Intermediate layer | Fluorine-based resin layer | Second intermediate layer | Second substrate layer | Total film thickness (μm) |
|---|---|---|---|---|---|---|
| Example 5 | PET [50 μm] | Intermediate layer 1 [20 μm] | PCTFE [25 μm] | Intermediate layer 1 [20 μm] | PET [50 μm] | 165 |
| Example 6 | PET [50 μm] | Intermediate layer 2 [20 μm] | PCTFE [25 μm] | Intermediate layer 2 [20 μm] | PET [50 μm] | 165 |
| Example 7 | PET [50 μm] | Intermediate layer 1 [30 μm] | ECTFE [25 μm] | Intermediate layer 1 [30 μm] | PET [50 μm] | 185 |
| Example 8 | PET [50 μm] | Intermediate layer 3 [20 μm] | PCTFE [25 μm] | Intermediate layer 3 [20 μm] | PET [50 μm] | 165 |
| Comparative Example 2 | PET [50 μm] | Intermediate layer 4 [20 μm] | PCTFE [25 μm] | Intermediate layer 4 [20 μm] | PET [50 μm] | 165 |

In Table 4, respective symbols mean the following materials. A numerical value in parenthesis is the thickness of each layer.

PET: Polyethylene terephthalate resin. NOVAPEXI4 manufactured by Mitsubishi Chemical Corporation is used.

PCTFE: Polychlorotrifluoroethylene resin. DF0050-C1 manufactured by DAIKIN INDUSTRIES, LTD. is used.

ECTFE: Chlorotrifluoroethylene-ethylene copolymer.

Intermediate layers 1 to 4: Intermediate layers 1 to 4 shown in the above-mentioned Table 2.

<Assessment 2>

Concerning respective laminates of Examples 5 to 8 and Comparative Example 2, a water vapor permeability, measurement of a total light transmittance, measurement of a haze value, and visibility were assessed by the same methods as those of <Assessment 1>. The results thereof are described in Table 5

TABLE 5

| | Water vapor permeability [g/m$^2$/24 h] | Total light transmittance | Haze value | Visibility |
|---|---|---|---|---|
| Example 5 | 0.26 | 90 | 15 | ⊙ |
| Example 6 | 0.26 | 91 | 18 | ○ |
| Example 7 | 0.41 | 87 | 30 | ○ |
| Example 8 | 0.26 | 86 | 33 | ○ |
| Comparative Example 2 | 0.26 | 51 | 58 | X |

As shown in the above-mentioned results, the laminates of Examples 5 to 8, to which the present invention had been applied, had low water vapor permeability and were also excellent in visibility. Concerning the laminate of Comparative Example 2, the water vapor permeability was equivalent to that of Examples, but the visibility was reduced due to deterioration of the adhesion between the substrate layer and the intermediate layer, or the adhesion between the intermediate layer and the fluorine-based resin layer.

What is claimed is:

1. A laminate of a five-layer configuration consisting of a substrate layer, an intermediate layer, a fluorine-based resin layer, a second intermediate layer, and a second substrate layer in this order,
wherein
a thickness of said substrate layer is 50 μm or more to 250 μm or less, a thickness of said second substrate layer to that of said substrate layer is 0.5 times to 1.1 times,
each of said substrate layer and said second substrate layer only contains a polyester-based resin,
each of said intermediate layer and said second intermediate layer only contains polyethylene-based resin, a styrene-ethylene-butylene-styrene copolymer, and epoxidized polybutadiene,
a total light transmittance of said laminate is 90% or more,
a haze value of said laminate is 25% or less, and
a water vapor permeability of said laminate is 0.3 $g/m^2/24$ hours or less,
wherein the laminate is deepdrawn.

2. The laminate according to claim 1, wherein said fluorine-based resin layer contains polychlorotrifluoroethylene.

3. A blister container comprising the laminate according to claim 1.

4. A press-through package comprising the laminate according to claim 1.

* * * * *